United States Patent

[11] 3,579,000

| | | |
|---|---|---|
| [72] | Inventor | Joseph W. Mathews<br>3762 Swansea Drive, Mobile, Ala. 36608 |
| [21] | Appl. No. | 877,933 |
| [22] | Filed | Nov. 19, 1969 |
| [45] | Patented | May 18, 1971 |

[54] SUSPENDED MOTOR VIBRATORY APPARATUS
8 Claims, 4 Drawing Figs.

[52] U.S. Cl. ............................................................ 310/15, 310/27
[51] Int. Cl. ................................................................ H02k 33/00
[50] Field of Search........................................... 310/15--35, 13

[56] References Cited
UNITED STATES PATENTS

| 938,708 | 11/1909 | Rowe | 310/27 |
|---|---|---|---|
| 1,833,914 | 12/1931 | Ruben | 310/27X |
| 3,469,163 | 9/1969 | Mathews | 310/27X |

*Primary Examiner*—D. F. Duggan
*Attorneys*—Giles C. Clegg, Jr. and Peter J. Murphy

ABSTRACT: Apparatus for mounting within a case which represents the vibrating load, includes an electric motor assembly and a suspension bracket to which the case is rigidly attached. The motor includes a relatively heavy housing which defines a magnetic stator structure, and a relatively light reciprocating armature structure. The armature oscillates lever arms pivotally connected to the motor stator; with the lever arms being coupled to the suspension bracket to effect relative reciprocating movement between the suspension bracket and motor stator.

INVENTOR
JOSEPH W. MATHEWS

ATTORNEYS

Patented May 18, 1971

INVENTOR

JOSEPH W. MATHEWS

ATTORNEYS

SUSPENDED MOTOR VIBRATORY APPARATUS

BACKGROUND OF THE INVENTION

This invention relates to motorized vibrating apparatus; and more particularly to a self-contained vibrating apparatus which is adapted for use in hand held tools and in larger devices and machines.

An undesirable characteristic of some forms of vibrating devices which are adapted for use in hand tools and larger machines is that, under load, the speed of the motor is substantially decreased with a resultant decrease in the frequency of vibration. In some instances, the motor may even be made to stall upon the application of sufficient load, resulting in possible damage to the device or power source, or injury to the operator.

An object of this invention is to provide improved motorized, vibrating apparatus which will maintain a relatively constant frequency of vibration under load.

A further object of this invention is to provide improved motorized vibrating device wherein the vibrating load structure has high kinetic energy.

A still further object of this invention is to provide an improved motorized vibrating apparatus suitable for use in massagers, reciprocating sanders, scrub brushes, polishers, floor cleaning machines, impacting tools, and the like.

These objects are accomplished in apparatus which includes a motor having a housing and a drive member reciprocable relative to the housing. A lever arm means pivotally mounted on the motor housing is oscillated by the drive member which is pivotally connected to the lever arm means adjacent to one end. A suspension frame, guided on a motor housing for reciprocating movement, is adapted to mount a load member which may be an enclosing case. The frame is pivotally connected to the lever arm means whereby the frame and case define the vibrating load of the apparatus.

DRAWINGS

The novel features of the invention, as well as additional objects and advantages thereof, will be understood more fully from the following description when read in connection with the accompanying drawings in which.

DESCRIPTION OF THE PREFERRED EMBODIMENT

Figure 1:
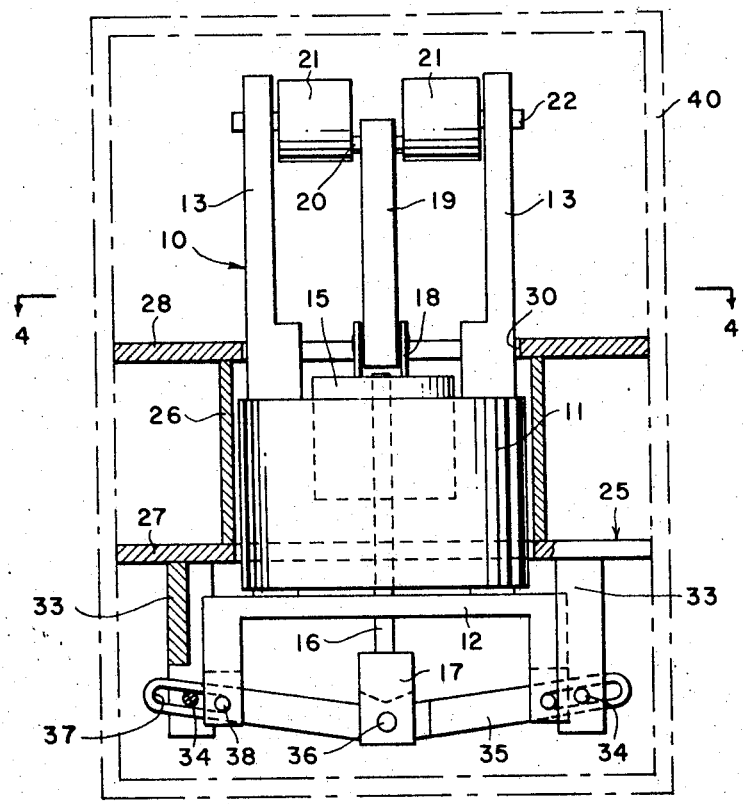
FIG. 1 is a front elevation view of vibrating apparatus according to the invention, with the suspension bracket being shown partly in section and with an enclosing case indicated in phantom.
Figure 3:
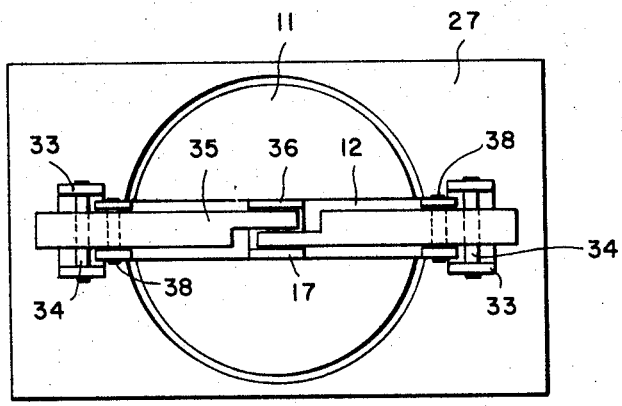
FIG. 3 is a bottom view of the apparatus of FIGS. 1 and 2.
Figure 2:
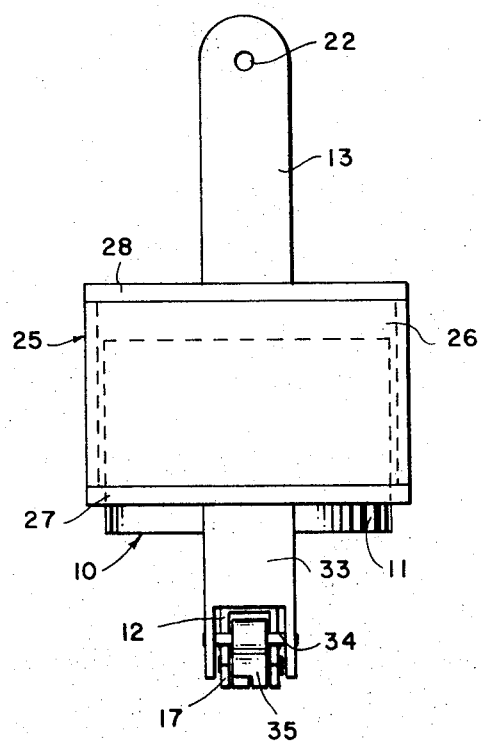
FIG. 2 is a side elevation view of the apparatus of FIG. 1.
Figure 4:
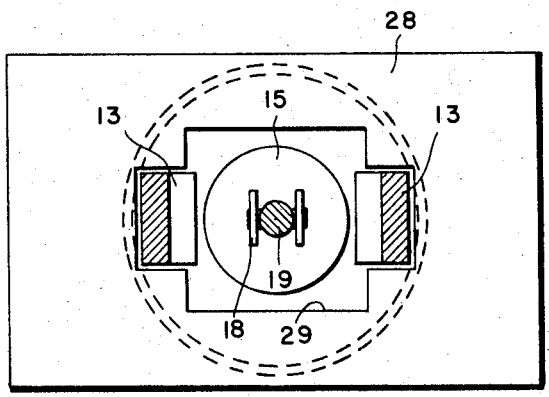
FIG. 4 is a view taken along the line 4—4 of FIG. 1 looking in the direction of the appended arrows.

The motor, as illustrated in the drawing, is an electrically operated motor having a reciprocating armature. In a smaller tool or device, the motor may be battery powered for example; and in other types of devices the motor may receive power from an external source. A motor suitable for use with the present invention is described in U.S. Pat. No. 3,469,163 issued Sept. 23, 1969.

Structure which may be described as the motor housing includes a magnetic stator structure 11 which is cylindrical in shape, and which is provided with a central recess for accommodating the armature to be described. The motor housing further includes a downwardly extending U-shaped bracket 12, by means of which the motor is attached to the load structure as will be described, and upwardly extending legs 13 attached to the load structure as will be described. The legs 13 define bearings for the armature excursion limiting structure to be described. The above mentioned stator 11, U-shaped bracket 12, and legs 13 are assembled to define a unitary structure.

The motor armature assembly includes a cylindrically shaped core member 15 partially received within the stator 11, and a downwardly extending drive shaft 16 which is rigidly attached to the core and which extends through and beyond the stator 11. A yoke 17 is attached to the lower end of the drive shaft for coupling the drive shaft to levers to be described.

A second yoke 18, secured to the upper end of the armature core 15, receives the lower end of a crank rod 19 and supports a journal pin for pivotally securing the crank rod within the yoke. The upper end of the crank rod 19 includes a transverse journal pin 20, the opposite ends of which are received in oppositely disposed bearing recesses provided in axially confronting faces of crank wheels 21. The crank wheels 21 are rotatably mounted, on a common axis, on stub shafts 22 supported in the upper ends of the motor legs 23. During reciprocation of the motor armature, then, the crank wheels define the limit of excursion of the armature and the yoke 17.

The motor 10 is supported and guided for relative reciprocating movement within a suspension frame 25. This suspension frame includes a cylindrical sleeve 26 having an inner diameter slightly larger than the outer diameter of the cylindrical stator 11, with the sleeve partially surrounding the stator. A transverse plate 27 is secured to the lower end of the sleeve 26, this plate having an opening corresponding in diameter to the inner diameter of the sleeve and defining a continuation of the sleeve opening. This plate 27 defines a lower radially extending mounting flange having a rectangular periphery as indicated in the drawings. An upper plate 28 is fixed to the upper end of the sleeve 26 and has an opening 29 including end recesses 30 dimensioned to accommodate and confine the motor legs 13 whereby this plate 28 is guided for reciprocating movement on the legs 13. The upper plate 28 also defines a radially extending flange shown in the drawings to have a rectangular periphery.

Rigidly fixed to the lower plate 27, and extending downwardly therefrom, are spaced arms 33; the lower ends of the arms defining yokes supporting parallel transverse pins 34. The motor assembly includes a pair of arms 35 which extend outwardly from the armature yoke 17, the inner ends of the arms being pivotally connected to the yoke by pin 36. The arms 35 are accommodated within the yokes provided in the lower ends of the motor bracket 12; and the arms are provided with elongated slots 37 through which pass transverse pivot pins 38 mounted in the motor bracket 12. The inner ends of the arm slots accommodate the motor bracket pins 38; and the slots extend outwardly therefrom being accommodated within the yokes of the frame arms 33, with the pins 34 passing through the slots 37 in outward spaced relation to the pivot pins 38.

As seen in the drawings, the length of the lever arm defined between the drive pin 36 and the pivot pins 38 is considerably greater than the length of the lever arm defined between the pivot pins 38 and the suspension frame pins 34. Accordingly, the excursion of the reciprocating armature yoke 17 will be proportionately greater than the excursion of the suspension frame pins 34. It will be seen then that reciprocation of the motor armature relative to the stator will produce reciprocation of the suspension frame relative to the stator but at a much lower amplitude. While the above described balanced lever arm system is preferred, since it prevents side loading of the shaft 16, a single lever arm system may be used.

While the flanges of the plates 27 and 28 are shown to have a rectangular periphery, these flanges are provided for the securing to the suspension frame a load member such as an enclosing case 40, as indicated in phantom in FIG. 1. Accordingly these flanges may have any desired shape to accommodate the case 40 which would be rigidly secured to the suspension frame 25 to define therewith the vibrating load of a device or machine. If the vibrating device were designed as a massager for example, the case 40 might be suitably contoured to be readily held in the hand of an operator, and provided with one or more suitably contoured surfaces for engagement with the body.

In operation, when the motor is energized, the armature and armature yoke 17 are reciprocating with the excursion limit fixed by the crank wheels 21. With the indicated lever ratio, the suspension frame 25 and the case 40 will be reciprocated with less excursion. With the indicated lever arm ratios, the weight of the motor stator assembly may be designed to be about the same as the combined weight of the suspension frame and case, with the weight of the motor armature assembly being relatively small; and the suspension frame case assembly will tend to vibrate relative to the motor. However, should the case be held in a manner to limit the amplitude of its vibration, the supression of mounting bracket motion will result in increased motor motion but without substantial change in speed. The lever ratios and the weights of the respective assemblies may be chosen so that the speed change with load is small.

A particular feature of the invention is the lever mechanism for coupling the motor to the load wherein the lever ratios may be selected to provide for minimum change of vibration frequency under load. Additionally, the unit may be designed to preclude the possibility that the motor may stall, which could result in damage to the apparatus or to the power source to the apparatus, or injury to the operator of the apparatus. An additional safety feature is that when the apparatus is designed so it cannot stall, the maximum power that the motor can receive from the source is predetermined.

What has been described is a novel suspended motor vibratory apparatus which is adapted for use with hand held tools or devices, or with larger machines.

I claim:

1. Vibratory apparatus comprising:
 a motor including a housing and a drive member reciprocable relative to said housing;
 lever arm means pivotally mounted on said motor housing; means coupling said motor drive member to said lever arm means for oscillating said lever arm means relative to said motor housing;
 a suspension frame guided on said motor housing for reciprocating movement relative hereto; said frame being adapted to mount a load member, and defining with said load member the vibrating load of said apparatus;
 and means coupling said suspension frame to said lever arm means for effecting reciprocating movement of said frame relative to said motor housing.

2. Vibratory apparatus as set forth in claim 1 including a casing fixed to said frame, defining therewith the vibrating load of said apparatus.

3. Vibratory apparatus as set forth in claim 2 wherein the weight of said motor drive member is small relative to the weight of said motor housing; and wherein the weight of said suspension frame and casing is of the order of the weight of said motor housing.

4. Vibratory apparatus as set forth in claim 1 wherein said lever arm means defines a relatively long lever arm between said motor housing pivot and said drive member coupling and a relatively short lever arm between said motor housing pivot and said suspension frame coupling.

5. Vibratory apparatus as set forth in claim 3 wherein said lever arm means defines a relatively long lever arm between said motor housing pivot and said drive member coupling, and a relatively short lever arm between said motor housing pivot and said suspension frame coupling.

6. Vibratory apparatus as set forth in claim 1 wherein said motor is an electric motor; said motor housing including magnetic stator, and said motor drive member including an armature guided for reciprocating movement within said stator; and means coupling said motor housing and said drive member to limit the relative excursion of said armature.

7. Vibratory apparatus as set forth in claim 1 wherein said motor is an electrically operated motor; said motor housing including a magnetic stator structure, and said motor drive member including a magnetically actuated armature structure guided centrally within said stator structure for relative reciprocating movement;
 a pair of transverse arms pivotally connected at their inner ends to said motor drive member; means on said motor housing pivotally supporting said arms at points intermediate the ends of said arms equidistant from said drive member pivot;
 said suspension frame partially enclosing said motor housing, and having means pivotally connected to the outer ends thereof.

8. Vibratory apparatus as set forth in claim 7 said transverse arms defining relatively long lever arms between said motor housing pivots and said drive member pivot and defining relatively short lever arms between said motor housing pivots and said frame pivots, whereby the excursion of said frame relative to said motor housing is substantially less than the excursion of said motor drive member relative to said motor housing.